Patented Aug. 17, 1954

2,686,795

UNITED STATES PATENT OFFICE 2,686,795

CARBOXYLIC ACID AMIDO-ALKYL-AMINO ESTER SALTS

Adolf Koebner, Davyhulme, Urmston, England, assignor to Lankro Chemicals Ltd., Salters Lane, Eccles, Manchester, England, a corporation of Great Britain No Drawing. Application November 7, 1951, Serial No. 255,336

Claims priority, application Great Britain November 20, 1950

13 Claims. (Cl. 260—404.5)

This invention relates to new carboxylic acid amido-alkyl-amino ester salts and to a process for the production thereof.

It is the prinicipal object of this invention to produce a new class of carboxylic acid amido-alkyl-amino ester salts having new and useful properties as textile auxiliaries.

It is a special object of this invention to produce surface active amine-amides containing as the amine radical quaternary ammonium alkamine esters.

It is another special object of this invention to produce a new and improved class of substantive antistatic and finishing agents for textiles.

It is a further object of this invention to provide an efficient process for the production of carboxylic acid amido-alkyl-amino ester salts.

Other objects, features and advantages of this invention will be apparent from the more detailed description which follows.

The novel compounds produced in accordance with this invention constitute a special class of amine-amides which are carboxylic (preferably fatty) acid amido-alkyl-amino ester salts having the general formula:

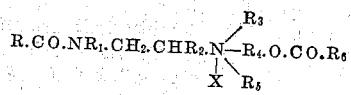

wherein R is a saturated or unsaturated cyclic or acyclic hydrocarbon, preferably an aliphatic or aralkyl, radical containing 8 to 20 carbon atoms; $R_1$ is H or a substituted or unsubstituted hydrocarbon radical, preferably an alkyl or aralkyl radical; $R_2$ is H or a substituted or unsubstituted hydrocarbon radical, preferably an alkyl or aryl radical; $R_3$ and $R_5$ are the same or different radicals and represent H or substituted and unsubstituted hydrocarbon radicals, preferably alkyl or hydroxyalkyl radicals; $R_4$ is an aliphatic hydrocarbon radical, preferably an alkylene radical; $R_6$ is a hydrocarbon radical, preferably an alkyl radical of 11 to 17 carbon atoms; and X is a halogen other than fluorine or other anion.

The novel carboxylic acid amido-alkyl-amine ester salts of this invention are produced by condensing an amide of an organic carboxylic acid containing from 9 to 21 carbon atoms in its acyl radical and containing a β-hydroxy aliphatic substituent on its amide nitrogen atom with a phosphorus halide (other than fluoride) or a sulphur oxyhalide (other than fluoride) and with an alkamine ester of a carboxylic acid containing from 12 to 18 carbon atoms in the acyl radical.

The condensations and reactions of this invention take place readily under relatively mild heating and without the necessity for using pressure vessels. Normally temperatures below 140° C. are adequate and most condensations take place readily at 130° C. or below, as at temperatures of 100 to 120° C.

The amides used in the condensation reactions of this reaction may be prepared by known methods, such as that disclosed in British Patent 631,387, or by the reaction of carboxylic acids with appropriate primary or secondary amines, or by the reaction of amides with appropriate alkylene oxides, such as ethylene oxide or isopropylene oxide and the like. The acids from which the amines are derived may be known cyclic or acyclic high molecular weight carboxylic acids having sufficiently large hydrophobic molecular components to product the desired surface activity and the proper balance between hydrophobic and hydrophilic properties. Such acids preferably include aliphatic or aromatic aliphatic carboxylic acids containing from 9 to 21 carbon atoms. Especially valuable products are derived from high molecular weight fatty acids.

When the amide component is derived by reaction of a carboxylic acid with an amine, it may be derived from known β-hydroxy aliphatic primary or secondary amines. Suitable primary amines readily available commercially include monoethanol amine, monopropanol amine, monobutanol amine and β-hydroxy, β-phenyl ethyl amine, such as derived from styrene. Presently commercially available β-hydroxy aliphatic secondary amines include such compounds as methyl ethanol amine, ethyl ethanol amine, diethanol amine and mixed aliphatic aromatic amines, such as benzyl ethanol amine.

The halogenated amine radical of this invention may be derived from known primary, secondary or tertiary alkamine esters. For example, secondary amine halides are derived from primary alkamine esters, tertiary amine halides from secondary alkamine esters and quaternary ammonium halides from tertiary alkamine esters. These alkamine esters may be obtained by known procedures, such as by reacting carboxylic acids with an appropriate alkanol amine. A wide variety of known alkanol amines may be used in forming the alkamine esters. Particularly valuable alkamines for use in the production of the amine-amide compounds of the present invention are obtained by condensing fatty acids of 12 to 18 carbon atoms with tertiary alkanol amines, such as triethanol amine, or mixed tertiary alkyl alkanol amines, such as methyl diethanol amine, ethyl diethanol amine, or diethyl ethanol amine, and the like. Where secondary or tertiary amine salts are desired as the final product, appropriate primary or secondary alkanol amines or appropriate mixed alkyl alkanol amines may be used in producing the alkamine esters. For example, suitable amines for condensing with the fatty acids to form primary or secondary alkamine ester reactants include such compounds as mono-ethanol amine, mono-propanol amine, mono-butanol amine, diethanol amine, methyl ethanol amine, ethyl ethanol amine, and the like.

Generally speaking, the compounds of the present invention can be obtained by condensing compounds having the formula:

$$RCO.NR_1.CH_2.CHR_2.OH$$

with a phosphorus halide other than a fluoride or a sulphur oxy-halide other than a fluoride, and with an alkamine ester of a fatty acid of the general formula:

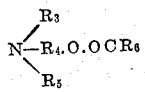

wherein the letters have the significance specified hereinbefore.

Thus a new class of amide-amine salts are provided wherein the amide component is an alkyl amide of a carboxylic acid containing from 9 to 21 carbon atoms in its acyl radical, and the amino component is an alkamine ester halide, other than a fluoride, substituted on the β-carbon atom of the alkyl radical and wherein the ester radical is that of a carboxylic acid containing 12 to 18 carbon atoms. Particularly valuable compounds are formed when the amide- and the ester-forming acid radicals are derived from fatty acids.

A preferred class of compounds produced in accordance with the procedures of this invention have the formula:

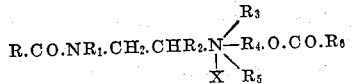

wherein R is a saturated or unsaturated cyclic or acyclic hydrocarbon radical and preferably an alkyl or aralkyl radical of 8 to 20 carbon atoms; $R_1$ is H or an alkyl or aralkyl radical which may be substituted or unsubstituted; $R_2$ is H or an aryl radical which may be substituted or unsubstituted; $R_3$ and $R_5$ are the same or different and are H or alkyl or hydroxyalkyl radicals; $R_4$ is an alkylene radical; $R_6$ is a saturated or unsaturated aliphatic hydrocarbon radical containing 11 to 17 carbon atoms; and X is a halogen atom other than fluorine.

It will be apparent to those skilled in the art that the base forming the salts of this invention may be separated or isolated from the halide salt, and salts of the base with other acids readily prepared. Likewise, by known methods, the halide may be replaced by other salt-forming radicals, such as other anions.

The high yields and purity of the products of the process of this invention have been determined by surface active titration as disclosed by T. Barr et al. in their article "The determination of surface active agents in solution," in Society of Chemical Industry Journal, vol. 67, February, 1948, pp. 45–48. The technique has been modified so that in the titration the dye passes from the aqueous to the chloroform phase. In the titration, pure recrystallized sodium dodecyl sulfate and a methylene blue solution (0.04% in 20% alcohol) were used as reagents. An M/1000 solution of the sodium dodecyl sulfate was made (0.288 gram per liter). Also a suitable quantity of the substance being tested was likewise weighed and water added to give about 1 liter of the solution thereby forming approximately an M/1000 solution. A preliminary rough estimate may be necessary to ascertain the appropriate weight of substance to be used. Ten mls. of this solution was transferred by pipette to a 50 ml. stoppered bottle and 1 ml. of N/2HCl, 20 mls. of CH₃Cl and 4 drops of methylene blue solution were added. The solution was then titrated with an M/1000 sodium dodecyl sulfate solution under vigorous shaking until the aqueous layer was completely colorless. The approach of the complete disappearance of color was indicated by the rapidity of the separation of the two layers after shaking. At the completion of the titration both layers separated bright and clear. The titration was sensitive to about 0.2 ml. in an M/1000 solution.

Complementary discussions of surface active titrations will be found in the following articles.

Association of Official Agricultural Chemists Journal, vol. 28, 1945. "General colorimetric method for determination of small quantities of sulfonated or sulfated surface active compounds," by J. H. Jones, pp. 398–409.

Industrial and Engineering Chemistry (Analytical Edition), vol. 15, 1943 (July-December). "Germicidal quaternary ammonium salts in dilute solution," by M. E. Auerbach, pp. 492–493.

Industrial and Engineering Chemistry (Analytical Edition), vol. 16, 1944 (July-December). "Colorimetric assay of quaternary ammonium salts," by M. E. Auerbach, p. 739.

Royal Society of London Proceedings, vol. 168, Series A (Mathematical and Physical Sciences), November 7, 1938. "Determination of the paraffin-chain radical," by G. S. Hartley and D. F. Runnicles, pp. 424–425.

The Journal of the Society of Dyers and Colourists, vol. 61, July 1945. "Tensimetric analysis of surface-active electrolytes," by J. M. Preston, pp. 165–166.

The following examples further illustrate the process and products of the present invention.

*Example 1*

One molecular proportion of β-chlorethyl oleoyl amide is prepared by treating one molecular proportion of β-hydroxy ethyl oleoyl amide with one third of a molecular proportion of phosphorus trichloride while keeping the temperature of the reaction mixture between 60 and 70° C. by gentle cooling. One hundred forty-nine grams of triethanol amine is carefully added to a benzene solution containing 284 grams of stearic acid and the benzene solution is heated under reflux under a water trap until 18 grams of water have been separated and the acid value of the reaction mass has fallen below five. The solution of the formed bis-(β-hydroxyethyl) amino-ethyl stearate is added to the separately prepared β-chlorethyl oleoyl amide and the mixture is refluxed for four hours during which time the quaternary amide ester chloride is formed. Then the benzene is removed by distillation and the reaction product is isolated as a pasty solid. This material readily emulsifies in water and can be used in the form of an aqueous paste as a textile auxiliary.

The reaction product has the following formula:

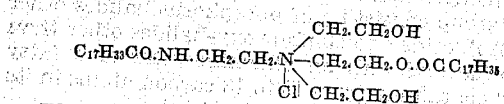

Thus, in accordance with this example, the symbols in the representative formula have the following significance: R.CO. is the oleoyl radical, $C_{17}H_{33}CO.$; $R_1$ and $R_2$ are each H; $R_4$ is $.CH_2CH_2.$; $R_3$ and $R_5$ are each $.CH_2.CH_2.OH$; $.COR_6$ is the stearoyl radical, $.COC_{17}H_{35}$; and X is Cl.

By substituting phosphorus tribromide or phosphorus triiodide in the reactions of this invention the corresponding bromide and iodide salts are obtained.

*Example 2*

A solution of one molecular proportion of N-β-hydroxyethyl N-methyl aminoethyl oleate is prepared by gradually introducing 119 grams of N-methyl diethanol amine into a solution of 282 grams of oleic acid in 500 grams of toluene and then gradually refluxing the mixture until 18 grams of water have formed and have been removed from the reaction mixture. One molecular proportion of N-β-chlorethyl N-benzyl oleyl amide is formed by reacting one molecular proportion of N-β-hydroxy-ethyl N-benzyl oleyl amide with ⅓ of a molecular proportion of phosphorus trichloride. In order to produce the reaction product, the phosphorus trichloride is added to the oleoyl amide while maintaining the reaction mixture at 60 to 70° C. by external cooling, and then the reaction is completed by stirring the mixture for an additional half hour. The formed oleoyl amide and alkamine oleate are then mixed and refluxed for four hours in order to form the desired amine-amide salt. Thereafter the solvent is removed by evaporation under a partial vacuum leaving a buttery mass which readily disperses in water and has superior properties as a textile finishing and antistatic agent.

The yield of amido-amine salt is determined in accordance with the procedure previously described. A yield of 90% of theoretical is obtained.

The reaction product has the following formula:

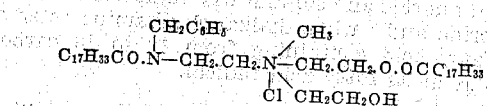

ance with this example, the symbols in the representative formula have the following significance: R.CO. is the oleoyl radical, $C_{17}H_{33}CO.$; $R_1$ is the benzyl group, $C_6H_5CH_2.$; $R_2$ is H; $R_3$ is $.CH_3$; $R_4$ is $.CH_2.CH_2.$; $R_5$ is $.CH_2.CH_2OH$; $.COR_6$ is the oleoyl radical, $C_{17}H_{33}CO.$; and X is Cl.

By substituting phosphorus tribromide or phosphorus triiodide in the reaction of this invention the corresponding bromide and iodide salts are obtained.

*Example 3*

A desired quantity of N-β-chlorethyl N-methyl lauryl amide is prepared by first stirring N-β-hydroxyethyl N-methyl lauryl amide with an equal molal amount of thionyl chloride while maintaining the temperature at about 60° C. by cooling and then completing the reaction by continuing the stirring at 60° C. for an hour. A corresponding molal quantity of bis-(β-hydroxyethyl) amino ethyl oleate is prepared as described hereinbefore or as described in British specification 587,534. The formed amide and alkamine ester are mixed and heated at 120° C. for four hours. At the end of the four hours of heating the quaternization of the amino ester by the chlorethyl amide has gone to completion. On cooling, the reaction product sets to a stiff paste which readily disperses in water and finds wide applicability as a textile auxiliary.

The reaction product has the following formula:

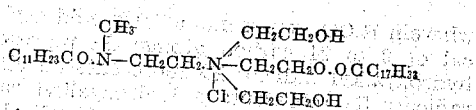

Thus, in accordance with this example, the symbols in the representative formula have the following significance: R.CO. is the lauroyl radical, $C_{11}H_{23}CO.$; $R_1$ is $.CH_3$; $R_2$ is H; $R_3$ and $R_5$ are each $.CH_2.CH_2OH$; $R_4$ is $.CH_2.CH_2.$; $.COR_6$ is the oleoyl radical, $C_{17}H_{33}CO.$; and X is Cl.

By substituting thionyl tribromide or thionyl triiodide in the reactions of this invention the corresponding bromide and iodide salts are obtained.

The new compounds of this invention are generally useful as capillary active textile treating agents. They are especially useful as textile auxiliaries for inhibiting the formation of electrical charges on spun fibers during their processing. The products of this invention also function to impart an excellent soft hand to a large variety of natural and synthetic fibers. The products of this invention give an especially fine hand to cellulose acetate textile materials.

The practice of this invention has been exemplified in the specification by various details and examples. It will be understood, however, that these details may be varied widely and that substitutions, additions or omissions can be made without departing from the spirit or the scope of the invention which is intended to be defined by the appended claims.

What is claimed is:

1. A new class of compounds of the general formula:

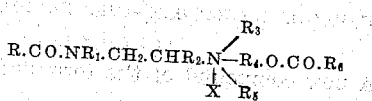

wherein R represents a member of the group consisting of cyclic and acyclic hydrocarbon radicals of 8 to 20 carbon atoms; $R_1$ represents a member of the group consisting of H and substituted and unsubstituted alkyl and aralkyl radicals; $R_2$ represents a member of the group consisting of H, an alkyl radical, and substituted and unsubstituted aryl radicals; $R_3$ and $R_5$ represent a member of the group consisting of H, alkyl and hydroxyalkyl radicals; $R_4$ represents an alkylene radical; $R_6$ represents saturated and unsaturated aliphatic hydrocarbon radicals of 11 to 17 carbon atoms; and X is a halogen atom other than fluorine.

2. A new class of compounds of the general formula:

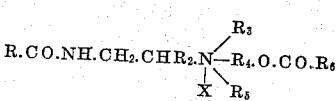

wherein R.CO. represents a fatty acid acyl radical of 9 to 21 carbon atoms; $R_2$ represents a member of the group consisting of H, an alkyl radical, and substituted and unsubstituted aryl radicals; $R_3$ and $R_5$ represent a member of the group consisting of H, alkyl and hydroxyalkyl radicals; R₄ represents an alkylene radical; CO.R₆ represents a fatty acid acyl radical of 12 to 18 carbon atoms; and X is a halogen atom other than fluorine.

3. A new class of compounds of the general formula:

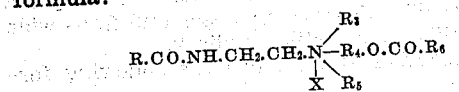

wherein R.CO. represents a fatty acid acyl radical of 9 to 21 carbon atoms; R₃ represents a hydroxyalkyl radical; R₄ represents an alkylene radical; R₅ represents a hydroxyalkyl radical; CO.R₆ represents a fatty acid acyl radical of 12 to 18 carbon atoms; and X is a halogen atom other than fluorine.

4. A new class of compounds of the general formula:

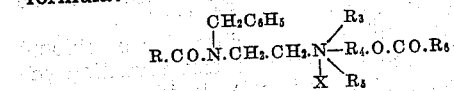

wherein R.CO. represents a fatty acid acyl radical of 9 to 21 carbon atoms; R₃ represents an alkyl radical; R₄ represents an alkylene radical; R₅ represents a hydroxyalkyl radical; CO.R₆ represents a fatty acid acyl radical of 12 to 18 carbon atoms; and X is a halogen atom other than fluorine.

5. A new class of compounds of the general formula:

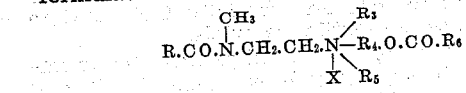

wherein R.CO. represents a fatty acid acyl radical of 9 to 21 carbon atoms; R₃ and R₅ represent hydroxyalkyl radicals; R₄ represents an alkylene radical; CO.R₆ represents a fatty acid acyl radical of 12 to 18 carbon atoms; and X is a halogen atom other than fluorine.

6. A new compound of the formula:

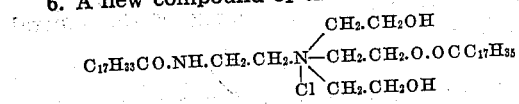

7. A new compound of the formula:

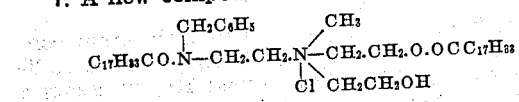

8. A new compound of the formula:

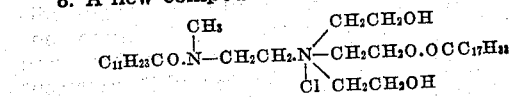

9. A process for producing carboxylic acid amido-alkyl-amino ester salts which comprises condensing an amide of a fatty acid containing from 9 to 21 carbon atoms in its acyl radical and containing a β-hydroxy aliphatic substituent on its nitrogen atom with a compound selected from the group consisting of phosphorus halides other than fluoride and sulphur oxy-halides other than fluoride and with an alkamine ester of a fatty acid containing from 12 to 18 carbon atoms in its carboxylic acid esterifying radical.

10. A process for producing carboxylic acid amido-alkyl-amino ester salts which comprises condensing a fatty acid amide containing from 9 to 21 carbon atoms in the acyl radical and containing a β-hydroxyalkyl substituent on its nitrogen atom with a compound selected from the group consisting of phosphorus halides other than fluoride and sulphur oxy-halides other than fluoride and with an alkamine ester of a fatty acid containing from 12 to 18 carbon atoms in its fatty acid radical, the condensation with said alkamine ester taking place at refluxing temperatures in excess of 100° C.

11. A process for producing carboxylic acid amido-alkyl-amino ester salts which comprises condensing an amide of a fatty acid containing from 9 to 21 carbon atoms in its acyl radical and containing a β-hydroxy aliphatic substituent on its nitrogen atom with a compound selected from the group consisting of phosphorus halides other than fluoride and sulphur oxy-halides other than fluoride and with a tertiary alkamine ester of a fatty acid containing from 12 to 18 carbon atoms in its carboxylic acid esterifying radical.

12. A process for producing carboxylic acid amido-alkyl-amino ester salts which comprises condensing a fatty acid amide containing from 9 to 21 carbon atoms in the acyl radical and containing a β-hydroxyalkyl substituent on its nitrogen atom with a compound selected from the group consisting of phosphorus halides other than fluoride and sulphur oxy-halides other than fluoride and with a tertiary aliphatic alkamine ester of a fatty acid containing from 12 to 18 carbon atoms in its fatty acid radical.

13. A process for producing carboxylic acid amido-alkyl-amino ester salts which comprises condensing a fatty acid amide containing from 9 to 21 carbon atoms in the acyl radical and containing a β-hydroxyalkyl substituent on its nitrogen atom with a compound selected from the group consisting of phosphorus halides other than fluoride and sulphur oxy-halides other than fluoride and with a dialkanol alkamine ester of a fatty acid containing from 12 to 18 carbon atoms in its fatty acid radical.

References Cited in the file of this patent

UNITED STATES PATENTS

| Number | Name | Date |
|---|---|---|
| 2,259,650 | Maxwell | Oct. 21, 1941 |
| 2,268,395 | Henke et al. | Dec. 30, 1941 |
| 2,282,702 | Bock | May 12, 1942 |